US008124557B2

(12) United States Patent
Lee et al.

(10) Patent No.: US 8,124,557 B2
(45) Date of Patent: *Feb. 28, 2012

(54) SUPPORTED METALLOCENE CATALYST, METHOD OF PREPARING THE CATALYST AND METHOD OF PREPARING POLYOLEFIN USING THE CATALYST

(75) Inventors: Eun Jung Lee, Daejeon (KR); Ki Soo Lee, Daejeon (KR); Sangwoo Lee, Daejeon (KR); Seungwhan Jung, Suwon (KR); Jong Joo Ha, Daejeon (KR); Choong Hoon Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/220,158

(22) Filed: Sep. 6, 2005

(65) Prior Publication Data

US 2006/0052238 A1  Mar. 9, 2006

(30) Foreign Application Priority Data

Sep. 3, 2004  (KR) .................. 10-2004-0070233

(51) Int. Cl.
*B01J 21/00*  (2006.01)
*B01J 23/00*  (2006.01)
*B01J 25/00*  (2006.01)
*B01J 29/00*  (2006.01)
*B01J 31/00*  (2006.01)
*B01J 37/00*  (2006.01)
*B01J 21/04*  (2006.01)
*B01J 23/02*  (2006.01)
*C08F 4/02*  (2006.01)
*C08F 4/60*  (2006.01)

(52) U.S. Cl. ........ 502/117; 502/100; 502/102; 502/150; 502/439

(58) Field of Classification Search .................. 502/103, 502/117, 150, 102, 100, 439; 02/150
See application file for complete search history.

(56) References Cited

U.S. PATENT DOCUMENTS

| 5,057,475 | A | * | 10/1991 | Canich et al. ................. 502/104 |
| 5,071,808 | A | * | 12/1991 | Antberg et al. ................ 502/107 |
| 5,324,800 | A | | 6/1994 | Welborn, Jr. et al. ......... 526/160 |
| 5,466,766 | A | * | 11/1995 | Patsidis et al. ................ 526/129 |
| 5,814,574 | A | | 9/1998 | McNally |
| 5,824,620 | A | * | 10/1998 | Vega et al. ..................... 502/117 |
| 5,846,895 | A | * | 12/1998 | Gila et al. ...................... 502/107 |
| 5,861,352 | A | * | 1/1999 | Gila et al. ...................... 502/155 |
| 5,955,625 | A | * | 9/1999 | Canich ............................. 556/7 |
| 5,977,392 | A | * | 11/1999 | Royo et al. ...................... 556/11 |
| 5,986,025 | A | * | 11/1999 | Huh et al. ...................... 526/119 |
| 6,018,064 | A | * | 1/2000 | Mendez Llatas et al. ....... 556/11 |
| 6,114,555 | A | * | 9/2000 | Llinas et al. .................... 556/11 |
| 6,133,187 | A | * | 10/2000 | Vega et al. ..................... 502/103 |
| 6,143,685 | A | * | 11/2000 | Llinas et al. ................... 502/152 |
| 6,388,029 | B1 | * | 5/2002 | Llinas et al. ................... 526/128 |
| 6,635,778 | B1 | * | 10/2003 | Royo et al. ...................... 556/11 |
| 7,041,618 | B2 | * | 5/2006 | Lee et al. ...................... 502/152 |
| 7,247,595 | B2 | * | 7/2007 | Lee et al. ...................... 502/103 |
| 7,294,600 | B2 | * | 11/2007 | Lee et al. ...................... 502/113 |
| 2003/0166455 | A1 | * | 9/2003 | Shin et al. ...................... 502/102 |
| 2003/0191013 | A1 | * | 10/2003 | Munoz-Escalona Lafuente et al. ............................. 502/117 |
| 2003/0195109 | A1 | * | 10/2003 | Royo et al. .................... 502/117 |
| 2004/0058804 | A1 | * | 3/2004 | Lee et al. ...................... 502/104 |
| 2005/0065018 | A1 | * | 3/2005 | Llinas et al. ................... 502/152 |
| 2005/0065019 | A1 | * | 3/2005 | Royo et al. .................... 502/155 |

FOREIGN PATENT DOCUMENTS

| CN | 1314920 | 9/2001 |
| CN | 1463273 | 12/2003 |
| EP | 0 206 794 | * 12/1986 |
| EP | 0 293 815 | * 5/1988 |
| EP | 0 757 992 | * 2/1997 |
| EP | 0 802 203 | * 10/1997 |
| JP | 05-301919 | 11/1993 |
| JP | 01-056928 | 3/1994 |
| JP | 06-228222 | 8/1994 |
| JP | 07-268029 | 10/1995 |
| JP | 08157515 | 6/1996 |
| JP | 2003502492 | 3/2000 |
| JP | 2004520476 | 7/2004 |
| JP | 2004217927 | 8/2004 |
| JP | 2006509904 | 3/2006 |

(Continued)

OTHER PUBLICATIONS

B.Y. Lee et al., J. Organomet. Chem., vol. 552, pp. 313-317 (1998).*
F.A. Cotton, G. Wilkinson, "Advanced Inorganic Chemistry", 4th ed., 1980, p. 395.*
Andresen, A., et al., "Halogen-Free Soluble Ziegler Catalysts for the Polymerization of Ethylene. Control of Molecular Weight by Choice of Temperature," Angew. Chem. Int. Ed. Engl., vol. 15, No. 10, pp. 630-632 (1976).
Alexakis, A., "Mild Protection of Alcohols as Ter-Butyl Ethers in the Field of Pheromone Synthesis," Tetrahedron Letters, vol. 29, No. 24, pp. 2951-2954 (1988).

(Continued)

*Primary Examiner* — James McDonough
(74) *Attorney, Agent, or Firm* — Cantor Colburn LLP

(57) ABSTRACT

Provided are a supported metallocene catalyst which has excellent supporting efficiency due to an interaction between a cocatalyst supported on a carrier and a metallocene compound substituted with a functional group that can function as a Lewis base, such as acetal, ketal, tert-alkoxy alkyl, benzyloxy alkyl, substituted benzyloxy alkyl, monothioacetal, or monothioketal, and a method of polymerizing an olefin using the supported metallocene catalyst. In the supported metallocene catalyst, the metallocene catalyst is strongly bound to the carrier due to a Lewis acid-base interaction between the metallocene compound and the cocatalyst, and thus the metallocene catalyst is not separated from the carrier during the polymerization of polyolefin in a slurry or gas phase method. Thus, fouling is prevented and the prepared polymer has a good particle shape and a high apparent density. Thus, the supported metallocene catalyst can be suitably used in a conventional slurry or gas phase polymerization process.

13 Claims, No Drawings

FOREIGN PATENT DOCUMENTS

| | | |
|---|---|---|
| KR | 10-2001-0081727 A | 8/2001 |
| KR | 100358225 B1 | 10/2002 |
| KR | 1020040061918 A | 7/2004 |
| KR | 1020040061926 A | 7/2004 |
| WO | 00/78827 A1 | 12/2000 |
| WO | 02/094841 A1 | 11/2002 |

OTHER PUBLICATIONS

Lee, B.Y., et al., "Ethylene Polymerization by Zirconocene Compounds Having Ether Bonds," Journal of Organometallic Chemistry, vol. 552, pp. 313-317 (1998).

Taiwanese Office Action dated Dec. 5, 2008 (English Translation); Date of Completion of Search: Nov. 14, 2008.

Supplementary European Search Report dated Sep. 15, 2009.

"Preparation of Anchored Metallocene Complexes on Dehydroxylated Silica and Their Use in the Polymerization of Ethylene"; Authors: Lee, et al.; Macromolecules 2000, 33, 3194-3195.

Chinese Office Action dated Nov. 13, 2009 with English Translation.

PCT Search Report for PCT/KR2005/002913 dated Dec. 21, 2005.

* cited by examiner

SUPPORTED METALLOCENE CATALYST, METHOD OF PREPARING THE CATALYST AND METHOD OF PREPARING POLYOLEFIN USING THE CATALYST

TECHNICAL FIELD

The present invention relates to a supported metallocene catalyst, and more particularly to, a supported metallocene catalyst which does not easily separate from a carrier, a method of preparing the catalyst, and a method of preparing a polyolefin using the catalyst.

BACKGROUND ART

Professor Kaminsky, et al reported in 1976 that olefins may be polymerized using a methylaluminoxane (MAO) compound as a cocatalyst and a zirconocenedichloride compound as a catalyst (A. Anderson, J. G. Corde, J. Herwig, W. Kaminsky, A. Merck, R. Mottweiler, J. Pein, H. Sinn, and H. J. Vollmer, Angew. Chem. Int. Ed. Engl., 15, 630, 1976).

U.S. Pat. No. 5,324,800, filed by Exxon, describes olefin polymerization using a metallocene compound comprising a cyclopentadienyl ligand having a variety of substituents.

Metallocene catalysts have a uniform distribution of active sites, and thus, when using them in the production of a polymer, the distribution of molecular weight of the polymer obtained is narrow, the copolymerization of the polymer can be easily performed, and the distribution of a second monomer is uniform. Further, when using metallocene catalysts in the polymerization of propylene, a stereostructure of the polymer can be controlled according to the symmetricity of a catalyst. When Ziegler-Natta catalysts are used, only isotactic polypropylene can be prepared, but when metallocene catalysts are used, various polypropylenes, for example, isotatic, syndiotactic, atactic, and hemiisotactic polypropylenes, can be stereoregularly prepared. For example, syndiotactic polypropylene synthesized using a metallocene has low crystallinity, appropriate rigidity and hardness, and high transparency and impact resistance. That is, when the metallocene catalysts are used in the preparation of polyolefins, conformation of the polyolefins can be controlled and physical properties of the polymers can be easily controlled. Thus, vigorous research has been conducted on metallocene catalysts.

However, the technique of olefin polymerization using a homogeneous catalyst cannot be used in a gas phase process or a slurry process, since the shape of the polymer cannot be easily controlled. Further, an excess amount of MAO is required to maximize the activity of the metallocene catalyst. In order to overcome these problems, the metallocene catalyst should be supported on an appropriate carrier. The supported metallocene catalyst can control the shape of the obtained polymer and control the molecular weight distribution according to its applications. Further, the supported metallocene catalyst can increase an apparent density of the obtained polymer and reduce fouling in the reactor.

In general, conventional methods of preparing a supported metallocene catalyst include a method including chemically and physically binding a metallocene compound to a carrier and then contacting the resultant product to aluminoxane, a method including supporting aluminoxane on a carrier and then reacting the resultant product with a metallocene compound, a method of contacting a metallocene compound with aluminoxane and then supporting the resultant product on a carrier, etc. In order to have the same high activity and copolymerization efficiency as the homogeneous catalyst, the supported catalyst should maintain a single active site structure after being supported. In order to prevent the reactor fouling, the catalyst must not be separated from the carrier during the polymerization. The particle size, particle size distribution, and apparent density of the polymer depend on the particle shape and the mechanical properties of the supported catalyst.

Korean Laid-Open Patent Publication No. 10-0404780 describes a metallocene compound having a silacycloalkyl substituent and a supported catalyst using the compound. However, when the supported catalyst is used in a gas phase process or a slurry process, the catalyst is separated from the carrier, and thus, may induce reactor fouling.

Japanese Laid-Open Patent Publication No. Hei 6-56928 describes a method of preparing a supported metallocene catalyst, including supporting a ligand on a surface of a carrier via a chemical bond and then, binding metal to the ligand. This method is very complicated and a large amount of the catalyst cannot be easily supported on the carrier.

The method including supporting aluminoxane on a carrier and then reacting the resultant product with a metallocene compound among the above methods is the oldest method of preparing a heterogeneous catalyst having a single active site. For example, silica can be reacted with a solution of aluminoxane and filtered to obtain a filtrate and the filtrate can be reacted with zirconocene dissolved in toluene or an aliphatic hydrocarbon solvent, thereby preparing a supported catalyst. The obtained supported catalyst can be directly used in the polymerization or copolymerization of ethylene performed in a gas phase process or a slurry process. In this method, the cocatalyst is physically/chemically secured on a surface of the carrier and the catalyst forms an ion bond with the cocatalyst like a homogeneous catalyst, and thus, the catalytic activity is relatively high. Further, since a single phase catalyst can be prepared without further adding aluminoxane in the polymerization reactor, this method can be easily applied in a conventional gas phase or slurry process. However, separation of the catalyst from the carrier cannot be completely prevented, and thus reactor fouling can occur. Also, the amount of aluminoxane that can be bound to silica is limited, and thus, the amount of the metallocene compound that can be bound to aluminoxane is limited.

DISCLOSURE OF THE INVENTION

The present invention provides a supported metallocene catalyst which is not separated from a carrier when polymerizing olefins, thus preventing reactor fouling, and has high polymerization activity.

The present invention also provides a method of preparing the supported metallocene catalyst.

The present invention also provides a method of preparing a polyolefin using the supported metallocene catalyst.

According to an aspect of the present invention, there is provided a supported metallocene catalyst, comprising:

a group 13 metal-containing organic metal compound as a cocatalyst component; and a metallocene compound selected from the group consisting of a compound having Formula 1, a compound having Formula 2, and a compound having Formula 3, the cocatalyst component and the metallocene compound being supported on a carrier containing a hydroxy group on its surface, wherein a Lewis acid-base interaction occurs between the cocatalyst component and the metallocene compound, $$(C_p R^1{}_a R^m{}_b)(C_{p'} R^2{}_{a'} R^n{}_{b'})_z MQ_k \tag{1}$$

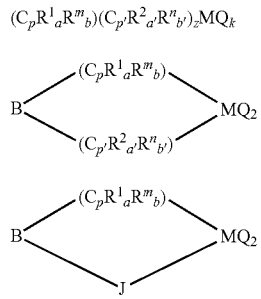  (2)

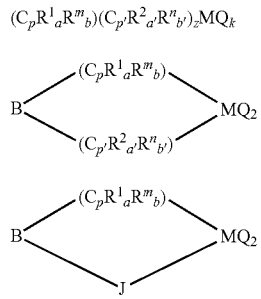  (3)

wherein $C_p$ and $C_{p'}$ are each independently selected from the group consisting of cyclopentadienyl, indenyl, 4,5,6,7-tetrahydro-1-indenyl, and fluorenyl radicals;

$R^m$ and $R^n$ are each independently a hydrogen radical or a $C_1$-$C_{20}$ alkyl, cycloalkyl, aryl, alkenyl, alkylaryl, arylalkyl, arylalkenyl or alkylsilyl radical;

$R^1$ and $R^2$ are each independently a hydrogen radical or a $C_1$-$C_6$ hydrocarbyl radical;

each of a, a', b, and b' is an integer ranging from 1 to 4;

M is a transition metal of group 4B, 5B or 6B of the periodic table;

Q is a halogen radical or a $C_1$-$C_{20}$ alkyl, alkenyl, aryl, alkylaryl, arylalkyl radical; or a $C_1$-$C_{20}$ alkylidene radical;

k is 2 or 3;

z is 0 or 1, and if k is 3, z is 0;

B is a radical selected from the group consisting of a $C_1$-$C_4$ alkyl radical and a hydrocarbyl radical containing silicon, germanium, phosphor, nitrogen, boron, or aluminum;

in Formula 3, J is a radical selected from the group consisting of $NR^s$, O, $PR^s$, and S; wherein $R^s$ is a $C_1$-$C_{20}$ alkyl radical or a substituted alkyl radical; and a hydrogen radical in $R^m$, $R^n$, E, or $R^s$ in formula 1, 2, or 3 is substituted by a radical having Formula 4, a radical having Formula 5, or a radical having Formula 6,

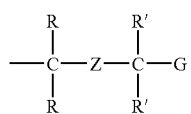  (4)

wherein

Z is an oxygen atom or a sulfur atom;

R and R' are each independently a hydrogen radical, a $C_1$-$C_{20}$ alkyl, cycloalkyl, aryl, alkenyl, alkylaryl, arylalkyl radical, or an arylalkenyl radical, and the two R' may be linked together to form a ring;

G is a $C_1$-$C_{20}$ alkoxy, aryloxy, alkylthio, arylthio, phenyl, or substituted phenyl, and may be linked to R' to form a ring;

if Z is a sulfur atom, G is alkoxy or aryloxy; and if G is alkylthio, arylthio, phenyl, or substituted phenyl, Z is an oxygen atom;

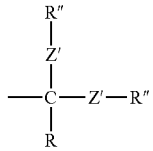  (5)

wherein

Z' is an oxygen atom or a sulfur atom, and at least one of the two Z' is an oxygen atom; and R and R" are each independently a hydrogen radical or a $C_1$-$C_{20}$ alkyl, cycloalkyl, aryl, alkenyl, alkylaryl, arylalkyl, or arylalkenyl radical, and R and R" or the two R" may be linked together to form a ring;

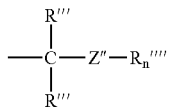  (6)

wherein

Z" is an oxygen atom, a sulfur atom, a nitrogen atom, a phosphor atom, or an arsenic atom;

R''' is a hydrogen radical, a $C_1$-$C_{40}$ alkyl, cycloalkyl, aryl, alkenyl, alkylaryl, arylalkyl, or arylalkenyl radical, and the R''' radicals are identical or different from each other;

R'''' is a hydrogen radical, a $C_1$-$C_{40}$ alkyl, aryl, alkenyl, alkylaryl, alkylsilyl, arylsilyl, phenyl, or a substituted phenyl radical; and n is 1 or 2, and if Z" is oxygen or sulfur, n is 1, and if Z" is nitrogen, phosphor, or arsenic, n is 2.

According to another aspect of the present invention, there is provided a method of preparing a supported metallocene catalyst, comprising:

reacting a cocatalyst comprising a group 13 metal-containing compound with a carrier containing a hydroxy group on its surface to obtain a carrier on which the cocatalyst is supported; and supporting the metallocene compound on the carrier on which the cocatalyst is supported, thereby maintaining a strong bond due to a Lewis acid-base interaction between a Lewis base of the metallocene compound and the metal atom of the cocatalyst.

According to another aspect of the present invention, there is provided a method of preparing a polyolefin, comprising polymerizing an olefin monomer at 50-150° C. in the presence of the supported metallocene catalyst.

BEST MODE FOR CARRYING OUT THE INVENTION

In a supported metallocene catalyst according to an embodiment of the present invention, a Lewis acid-base interaction occurs between a functional group of a metallocene catalyst and a cocatalyst, thus increasing the amount of metallocene that can be supported on a carrier. Also, the metallocene compound is more strongly bound to the cocatalyst due to the Lewis acid-base interaction, in addition to an ionic bond between the metallocene catalyst and the cocatalyst, and thus, the metallocene compound of a supported catalyst is not separated from the carrier during the polymerization of the olefins, thereby preventing fouling. Since one of acetal, ketal, tert-alkoxy alkyl, benzyl oxy alkyl, substituted benzyloxy alkyl, monothioacetal, monothioketal, etc., which are functional groups that can function as a Lewis base, is bound to cyclopentadiene, a cyclopentadiene derivative, or a bridge group, and the metal of the cocatalyst can function as a Lewis acid, the Lewis acid-base interaction occurs between the metallocene compound and the cocatalyst.

According to an exemplary embodiment of the present invention, in the above compounds having Formula 1 through 3, M may be titanium, zirconium, or hafnium and Q may be halogen, preferably chlorine.

Representative examples of the metallocene compound having Formula 1 include [A-O—(CH$_2$)$_a$—C$_5$H$_4$]$_2$ZrCl$_2$ or [A-O—(CH$_2$)$_a$—C$_9$H$_8$]ZrCl$_3$, where a is an integer from 4 to 8 and A is a radical selected from the group consisting of methoxymethyl, t-butoxymethyl, tetrahydropyranyl, tetrahydrofuranyl, 1-ethoxyethyl, 1-methyl-1-methoxyethyl, and t-butyl (Lee, B. Y., Oh, J. S., Organomet. Chem., 552, 1998, 313).

In the compound having Formula 2, E is a structural bridge between Cp and Cp' rings to provide steric rigidity to the Cp and Cp' rings in the catalyst, and the Cp and Cp' rings are substituted such that the Cp and Cp' rings are sterically different from each other. $R^1_a R^m_b$ is selected such that $(CpR^1_a R^m_b)$ is differently substituted from $(Cp'R^2_{a'} R^n_{b'})$.

According to exemplary embodiments of the present invention, representative examples of the metallocene compound having Formula 2 include [A-O—(CH$_2$)$_a$—C$_5$H$_4$]C(CH$_3$)$_2$[C$_{13}$H$_8$]ZrCl$_2$, [A-O—(CH$_2$)$_a$—C$_5$H$_4$]Si(CH$_3$)$_2$[C$_{13}$H$_8$]ZrCl$_2$, [C$_5$H$_5$]C(CH$_3$)(A-O—(CH$_2$)$_a$)[C$_{13}$H$_8$]ZrCl$_2$, and [C$_5$H$_5$]Si(CH$_3$)(A-O—(CH$_2$)$_a$)[C$_{13}$H$_8$]ZrCl$_2$, where a is an integer from 4 to 8 and A is a radical selected from the group consisting of methoxymethyl, t-butoxymethyl, tetrahydropyranyl, tetrahydrofuranyl, 1-ethoxyethyl, 1-methyl-1-methoxyethyl, and t-butyl.

According to exemplary embodiments of the present invention, representative examples of the metallocene compound having Formula 3 include [(A'-D-(CH$_2$)$_a$)](CH$_3$)X(C$_5$Me$_4$)(NCMe$_3$)]TiCl$_2$ and [(A-D-(CH$_2$)$_a$)](CH$_3$)X(C$_5$Me$_4$)(NCMe$_3$)]ZrCl$_2$, where a is an integer from 4 to 8, X is methylene, ethylene, or silicon, D is an oxygen atom or a nitrogen atom, and A' is a radical selected from the group consisting of a hydrogen atom, C$_1$-C$_{20}$ alkyl, alkenyl, aryl, alkylaryl, arylalkyl, alkylsilyl, arylsilyl, methoxymethyl, t-butoxymethyl, tetrahydropyranyl, tetrahydrofuranyl, 1-ethoxyethyl, 1-methyl-1-methoxyethyl, and t-butyl.

Representative examples of the metallocene compound according to embodiments of the present invention include, but are not limited to, the following compounds:

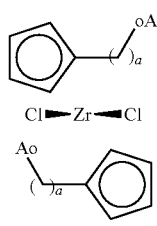
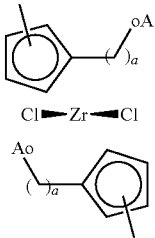
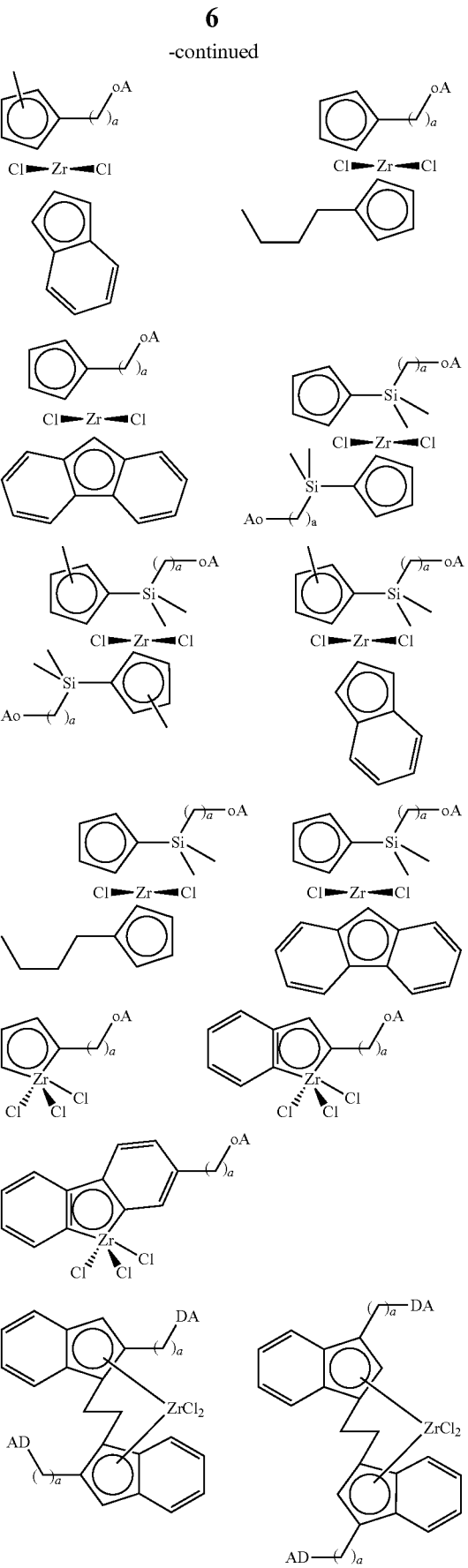

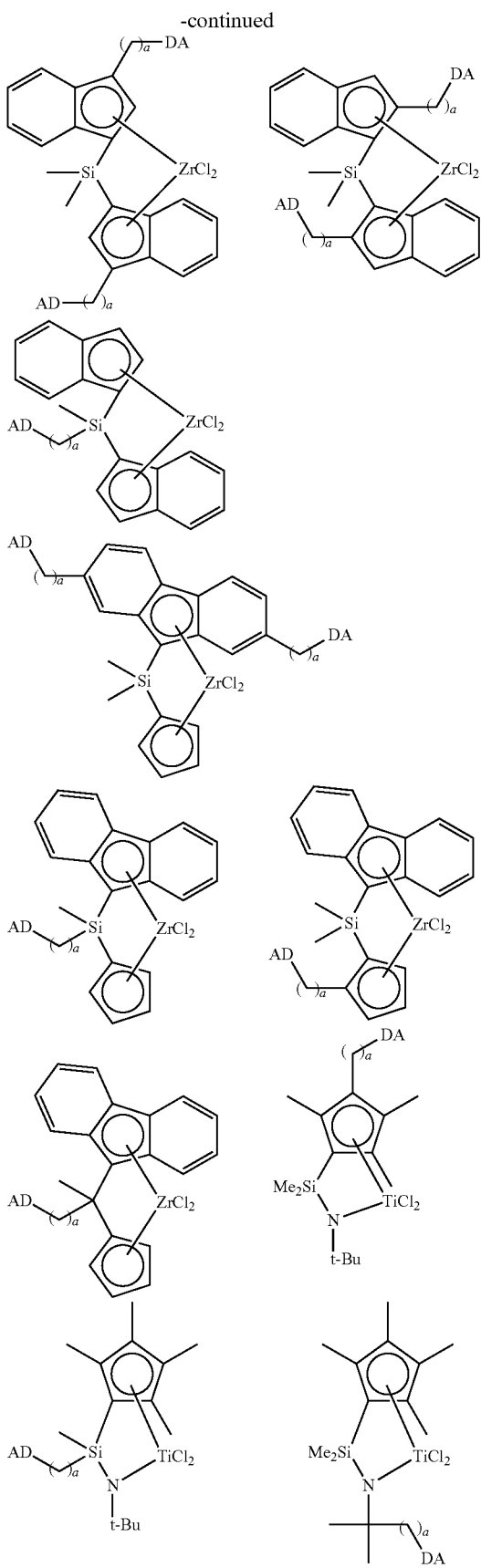

where
A, a, and D are as defined in Formulae 1 through 3.

The carrier used in embodiments of the present invention contains highly reactive hydroxy and siloxane groups on its surface since moisture is removed from its surface by drying. Specific examples of the carrier include silica, silica-alumina, and silica-magnesia dried at a high temperature. The carrier may contain oxides, carbonates, surfates, nitrates, such as $Na_2O$, $K_2CO_3$, $BaSO_4$, and $Mg(NO_3)_2$. The drying temperature may be 200-800° C., preferably 300-600° C., more preferably 300-400° C. If the drying temperature is lower than 200° C., a large amount of moisture remains on the surface of the carrier, which reacts with the cocatalyst. If the drying temperature is higher than 800° C., many hydroxy groups are lost and only siloxane groups remain on the surface of the carrier, and thus, the number of reaction sites for reacting with the cocatalyst is reduced.

The concentration of the hydroxy group on the surface of the carrier may be 0.1-10 mmol/g, preferably 0.5-1 mmol/g. The amount of the hydroxy group on the surface of the carrier may be controlled by varying the conditions when preparing the carrier or the drying conditions of the carrier (for example, temperature, time, vacuum drying or spray drying, etc.). When the concentration of the hydroxy group on the surface of the carrier is greater than 10 mmol/g, it is likely that the high concentration is induced by moisture, in addition to the hydroxy group on the surface of the silica particle which is impreferable.

The dried carrier may be mixed with a cocatalyst having Formula 7 to obtain the carrier on which the cocatalyst is supported. The cocatalyst is a group 13 metal-containing organic metal compound, which is a cocatalyst that is used in the polymerization of olefins in the presence of a conventional metallocene catalyst. When the cocatalyst is supported on the carrier, a bond is formed between the hydroxy group on the carrier and the group 13 metal of the cocatalyst.

$$—[Al(R^3)—O]_n— \qquad (7)$$

where $R^3$ is a halogen radical, a $C_1$-$C_{20}$ hydrocarbyl radical, or a $C_1$-$C_{20}$ hydrocarbyl radical substituted by a halogen, and the $R^3$ radicals are identical or different from each other ("there is only one $R^3$"); and n is an integer equal to or greater than 2.

The compound having Formula 7 may be linear, circular, or netlike. Examples of the compound having Formula 7 include methylaluminoxane (MAO), ethylaluminoxane, isobutylaluminoxane, butylaluminoxane, etc.

A molar ratio of [group 13 metal]/[transition metal] in the supported metallocene catalyst may be 1-10,000, preferably 1-1,000, more preferably 10-100. If the molar ratio is less than 1, little catalytically active species is formed due to a very small amount of Al, and thus the catalytic activity is very low. If the molar ratio is greater than 10,000, MAO may function as a catalytic poison.

The supported metallocene catalyst according to an embodiment of the present invention may be prepared by supporting a mixture of two or three of the compounds having Formula 1 through 3. By using the mixture, physical properties and a molecular weight distribution of the polyolefin to be produced can be easily controlled.

The supported metallocene catalyst in itself may be used in the polymerization of olefins by itself. Separately, the supported metallocene catalyst is allowed to contact an olefin monomer such as ethylene, propylene, 1-butene, 1-hexene, and 1-octene, to obtain a prepolymerized catalyst, which may be used in the polymerization of olefins.

In an embodiment of the present invention, a method of preparing a supported metallocene catalyst comprises:

reacting a cocatalyst comprising a group 13 metal-containing compound with a carrier containing a hydroxy group on its surface to obtain the carrier on which the cocatalyst is supported; and supporting the above metallocene compound on the carrier on which the cocatalyst is supported, thereby maintaining a strong bond due to a Lewis acid-base interaction between a Lewis base of the metallocene compound and the metal atom of the cocatalyst.

That is, in the present embodiment, the cocatalyst comprising the group 13 metal-containing organic compound is reacted with the carrier containing a hydroxy group on its surface, and then, the metallocene compound having cyclopentadiene, a cyclopentadiene derivative, or a bridge group substituted with a functional group that is an O-donor and can function as a Lewis base, for example, an alkoxy group, is reacted with the cocatalyst to prepare the supported metallocene catalyst. This is shown in Scheme 1. Referring to Scheme 1, in a supported metallocene catalyst, a Lewis acid-base interaction occurs between the functional group of the metallocene catalyst and Al, and thus, an increased amount of metallocene can be supported on a carrier. Further, the metallocene catalyst having the functional group is more strongly bound to the cocatalyst than a metallocene catalyst which does not have the functional group and forms only an ionic bond with the cocatalyst. Thus, the supported catalyst is not separated from the carrier during the polymerization of the olefins, thereby preventing reaction fouling and increasing polymerization activity.

Scheme 1

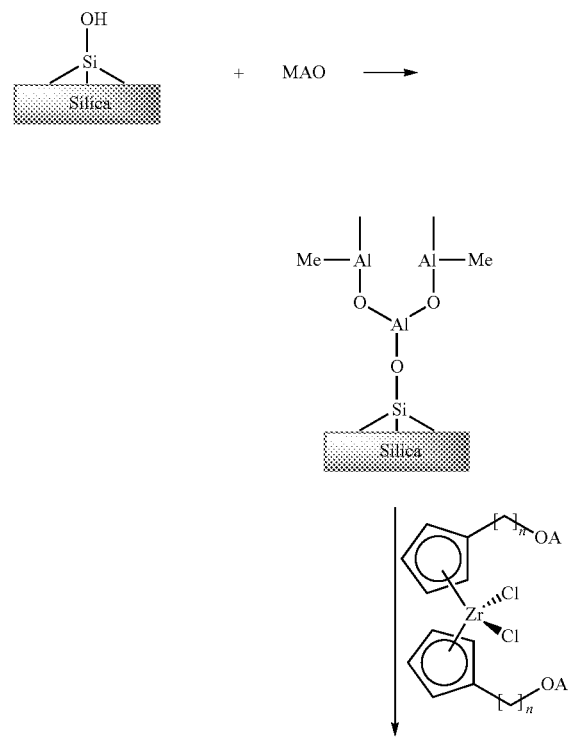
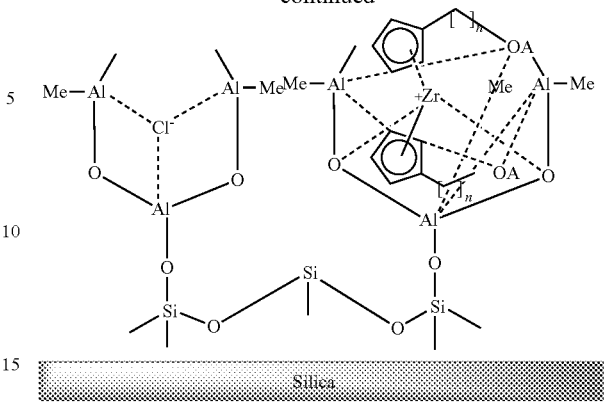

The reaction of the cocatalyst with the carrier can be performed in the presence or absence of a solvent. Examples of the solvent that can be used include an aliphatic hydrocarbon solvent, such as hexane and pentane, and an aromatic hydrocarbon solvent, such as toluene.

The reaction temperature may be −20-100° C., since the reaction solvent is in a liquid phase in this range. The reaction temperature is preferably −10-60° C., and more preferably 0-40° C., since the reaction can optimally proceed in this range. The reaction time may be from 10 minutes to 24 hours.

The carrier on which the cocatalyst is supported, obtained in this way, can be used for the subsequent process, after the solvent is removed under reduced pressure or filtration. When necessary, after the removal of the solvent, the carrier on which the cocatalyst is supported may be subjected to soxhlet filtration using aromatic hydrocarbon such as toluene, and then used for the subsequent process.

Examples of the solvent that can be used in the reaction of the metallocene catalyst with the carrier on which the cocatalyst is supported include an aliphatic hydrocarbon solvent, such as hexane or pentane, an aromatic hydrocarbon solvent, such as toluene or benzene, a chlorine-substituted hydrocarbon solvent, such as dichloromethane, an ether solvent, such as diethyl ether or THF, and other oraganic solvents, such as acetone and ethyl acetate. Preferably, the solvent is hexane, heptane, or toluene.

In the reaction of the metallocene catalyst with the carrier on which the cocatalyst is supported, the reaction temperature may be 0-100° C. and the reaction time may be from 5 minutes to 24 hours.

The supported metallocene catalyst obtained in this way can be used after the solvent is removed under reduced pressure or filtration. When necessary, after the removal of the solvent, the supported metallocene catalyst may be subjected to soxhlet filtration using aromatic hydrocarbon such as toluene before being used.

The polyolefin polymerization using the supported metallocene catalyst according to an embodiment of the present invention may be performed using a solution process, a slurry process, a gas phase process, or a combination of the slurry process and the gas phase process, preferably a slurry process or a gas phase process.

A slurry form of the supported metallocene catalyst may be injected into an olefin monomer for polymerization. Such a slurry is obtained by diluting the supported metallocene catalyst with a $C_5$-$C_{12}$ aliphatic hydrocarbon solvent which is suitable for the polymerization of olefins, such as pentane, hexane, heptane, nonane, decane, and isomers thereof, an aromatic hydrocarbon solvent, such as toluene and benzene, or a chlorine-substituted hydrocarbon solvent, such as dichloromethane and chlorobenzene, etc. Small amounts of water, air, etc. which function as catalytic poisons, may be removed from the solvent by treating the solvent with a small amount of alkyl aluminum, and a cocatalyst may be further used to remove the catalytic poisons.

Examples of the olefin monomer to be polymerized using the supported metallocene catalyst include ethylene, propylene, α-olefin, cyclic olefin, etc. and diene olefin monomer and triene olefin monomer which have at least two double bonds. Examples of the monomer includes ethylene, propylene, 1-butene, 1-pentene, 4-methyl-1-pentene, 1-hexene, 1-heptene, 1-decene, 1-undecene, 1-dodecene, 1-tetradecene, 1-hexadecene, 1-icosene, norbornene, norbornadiene, ethylidenenorbornene, vinylnorbornene, dicyclopentadiene, 1,4-butadiene, 1,5-pentadiene, 1,6-hexadiene, styrene, α-methylstyrene, divinylbenzene, 3-chloromethylstyrene, etc. Two or more of these monomer may be combined for copolymerization.

Hereinafter, the present invention will be described in more detail with reference to the following Examples. These Examples are provided for the purpose of illustration and are not intended to limit the scope of the invention.

In the following Examples, organic reagents and solvents required for the preparation of a catalyst and polymerization were obtained from Aldrich and purified using standard methods. Ethylene was obtained from Applied Gas Technology as a high purity product and filtered to remove moisture and oxygen before polymerization. Catalyst synthesis, supporting and polymerization were carried out in isolation from air and moisture to ensure experimental reproducibility.

An NMR spectrum was obtained to identify the catalyst structure using 300 MHz NMR (Bruker). The molecular weight and the molecular weight distribution were analyzed by gel permeation chromatography (GPC) using 150CV+ manufactured by Waters. The temperature during the GPC analysis was 140° C. and trichlorobenzene was used as a solvent, and a number average molecular weight ($M_n$) and a weight average molecular weight ($M_w$) were obtained using polystyrene as a standard material. The molecular weight distribution (polydispersity index (PDI)) was calculated by dividing the weight average molecular weight by the number average molecular weight.

The melt index (MI) of the polymer was measured according to ASTM D-1238 (conditions E and F, 190° C.). The MI measured in the condition E was designated $I_2$, and the MI measured in the condition F was designated $I_{21}$. Further, the MI value measured under a load of 5 kg in the same conditions as E and F was designated $I_5$.

The melting point (Tm) of the polymer was measured using Differential Scanning calorimeter (DSC) 2920 manufactured by TA Instrument. The temperature was raised to 200° C., maintained at 200° C. for 5 minutes, decreased to 30° C., and then raised again, at increasing and decreasing rates of 10° C./min, thereby obtaining the melting point, which is the peak of the DSC curve, observed in the second temperature raising region.

The amounts of zirconium and aluminum in the filtrate after the reaction with the supported catalyst were measured by performing inductively coupled plasma (ICP) analysis on the supported catalyst using an inductively coupled plasma-atomic emission spectrometer (ICP-AES) (XMP integra, manufactured by GBC).

Example 1

1-(1) Preparation of [$^t$Bu-O—(CH$_2$C$_5$H$_4$)$_2$ZrCl$_2$ (Compound A)

100 ml of anhydrous THF was added to t-butoxyhexylchloride (5.87 g, 30.46 mmole) prepared using 6-chlorohexanol according to the method suggested in Tetrahedron Lett. 2951 (1988). 17 ml of 2 N sodium cyclopentadienide (NaCp) was mixed into the resultant mixture in an ice bath, and after 3 hours, 200 ml of water was added to the mixture. Then, the hexane was removed under reduced pressure, 4.2 g of t-butoxyhexylcyclopentadienide (yield 60%, b.p. 80° C./0.1 mmHg) was obtained by distillation under reduced pressure (78° C./0.2 torr). Subsequently, the resultant product (4.06 g, 18.9 mmol) was dissolved in 20 ml of THF, and then solid n-butyl lithium (1.6 M hexane solution, 11.4 ml) was added to the obtained solution at −78° C. without contacting air. The resultant product was warmed to room temperature and stirred for 2 hours, and then all the volatile materials were removed from the product using a vacuum pump and 20 ml of THF was added thereto. Zirconium(IV) chloride tetrahydrofuran complex (3.6 g, 9.5 mmole) was added to the resultant product and stirred at 50° C. for 12 hours, and then all the volatile materials were removed from the product using a vacuum pump. The resultant product was recrystallized with hexane to obtain a white solid (yield 90%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H); $^{13}$C NMR (CDCl$_3$): 135.09, 116.66, 112.28, 72.42, 61.52, 30.66, 30.61, 30.14, 29.18, 27.58, 26.00.

1-(2) Preparation of Supported Metallocene Catalyst (Drying of a Carrier)

Silica (XPO 2412, manufactured by Grace Davison) was dehydrated and dried under a vacuum at 300° C. for 12 hours.

(Preparation of the Carrier on which Cocatalyst is Supported)

20 g of the dried silica was placed into a glass reactor and then a solution of methylaluminoxane (MAO) containing 13 mmol of aluminium in a toluene solution was added and slowly reacted at 40° C. for 1 hour while stirring. The resultant product was washed with a sufficient amount of toluene several times until the unreacted aluminium compound was removed. Then, the remaining toluene was removed under reduced pressure at 50° C. Thus, the carrier on which the cocatalyst is supported, i.e., MAO/SiO$_2$ (32 g) containing 17% Al, was obtained.

(Preparation of Supported Metallocene Catalyst)

1.6 g of the carrier on which the cocatalyst is supported was placed into a glass reactor and 10 ml of toluene was added thereto and the mixture was stirred. A solution in which 165 μmol (in terms of zirconium) of the metallocene compound obtained in Example 1-(1) was dissolved in toluene was added to the glass reactor and the mixture was reacted at 40° C. for 1 hour while stirring. Then, the resultant product was washed with a sufficient amount of toluene and dried in a vacuum to obtain a supported metallocene catalyst in the form of a solid powder. ICP analysis of the supported metallocene catalyst revealed that [Zr]=0.88%, [Al]=15.3%, and a molar ratio of [Al]/[Zr] was 59. In particular, the concentration of Zr in the supported metallocene catalyst showed that all the metallocene compound that was added during the supporting was detected, i.e., all the metallocene compound was supported on the carrier. For a more precise analysis, the toluene solutions used as the washing solution during the preparation of the supported metallocene catalyst were collected and subjected to ICP analysis. The ICP analysis revealed several ppm of Al but no Zr.

Example 2

2-(1) Preparation of [$^t$Bu-O—(CH$_2$)$_6$(CH$_3$)Si(C$_5$H$_4$) (9-C$_{13}$H$_9$)]ZrCl$_2$ (Compound B)

Grignard reagent, a t-butoxyhexylmagnesium chloride solution (0.14 mol), was obtained by reacting t-butoxyhexylchloride with Mg(O) in the presence of diethyl ether (Et$_2$O) as a solvent. Methyltrichlorisilane (24.7 ml, 0.21 mol) was added to the Grignard reagent at −100° C. and the mixture was stirred at room temperature for at least 3 hours and then filtered. The filtrate was dried in a vacuum to obtain t-butoxyhexyldichloromethylsilane (yield 84%). Then, a solution of fluorenyl lithium (4.82 g, 0.028 mol) in hexane (150 ml) was slowly added to a solution of t-butoxyhexyldichloromethylsilane (7.7 g, 0.028 mol) in hexane (50 ml) at −78° C. for 2 hours. Next, the resultant white precipitate (LiCl) was filtered off and extracted with hexane to obtain the desired product, and then all the volatile materials were removed by drying in a vacuum to obtain t-butoxyhexylfluorenylmethylsilane ($^t$Bu-O—(CH$_2$)$_6$)SiMe(9-C$_{13}$H$_{10}$) as a pale yellow oil (yield 99%). THF (50 ml) was added to the obtained compound and the mixture was reacted with a solution of lithium cyclopentadienide (2.0 g, 0.028 mol) in THF (50 ml) at room temperature for 3 hours. Then, all the volatile materials were removed by drying in a vacuum. Subsequently, the resultant product was extracted with hexane to obtain the final ligand ($^t$Bu-O—(CH$_2$)$_6$)(CH$_3$)Si(C$_5$H$_5$)(9-C$_{13}$H$_{10}$) as an orange oil (yield 95%). The structure of the ligand was confirmed by $^1$H NMR.

$^1$H NMR (400 MHz, CDCl$_3$): 1.17, 1.15 (t-BuO, 9H, s), −0.15, −0.36 (MeSi, 3H, s), 0.35, 0.27 (CH$_2$, 2H, m), 0.60, 0.70 (CH$_2$, 2H, m), 1.40, 1.26 (CH$_2$, 4H, m), 1.16, 1.12 (CH$_2$, 2H, m), 3.26 (tBuOCH$_2$, 2H, t, 3JH-H=7 Hz), 2.68 (methyleneCpH, 2H, brs), 6.60, 6.52, 6.10 (CpH, 3H, brs), 4.10, 4.00 (FluH, 1H, s), 7.86 (FluH, 2H, m), 7.78 (FluH, 1H, m), 7.53 (FluH, 1H, m), 7.43-7.22 (FluH, 4H, m)

Next, 2 equivalents of n-butyl lithium were added to a solution of the obtained ($^t$Bu-O—(CH$_2$)$_6$)(CH$_3$)Si(C$_5$H$_5$)(9-C$_{13}$H$_{10}$) (12 g, 0.028 mol) in THF (100 mol) at −78° C. and the mixture was reacted for at least 4 hours while being warmed to room temperature. Thus, ($^t$Bu-O—(CH$_2$)$_6$)(CH$_3$)Si(C$_5$H$_5$Li)(9-C$_{13}$H$_{10}$Li) was obtained as an orange solid (yield 81%).

Then, a solution of the ($^t$Bu-O—(CH$_2$)$_6$)(CH$_3$)Si(C$_5$H$_5$Li)(9-C$_{13}$H$_{10}$Li) (2.0 g, 4.5 mmol) in ether (30 ml) was slowly added to a suspension solution of zirconium(IV) chloride (1.05 g, 4.50 mmol) in ether (30 ml) at −78° C. and reacted at room temperature for 3 hours. All the volatile materials were removed by drying in a vacuum to obtain an oily liquid substance. Then, dichloromethane was added thereto and the mixture was filtered. The filtrate was dried in a vacuum and hexane was added to the dried product to induce precipitates. The resultant precipitates were washed with hexane several times to obtain a racemic-($^t$Bu-O—(CH$_2$)$_6$)(CH$_3$)Si(C$_5$H$_4$)(9-C$_{13}$H$_9$)ZrCl$_2$ compound as a red solid (yield 54%).

$^1$H NMR (400 MHz, CDCl$_3$): 1.19 (t-BuO, 9H, s), 1.13 (MeSi, 3H, s), 1.79 (CH$_2$, 4H, m), 1.60 (CH$_2$, 4H, m), 1.48 (CH$_2$, 2H, m), 3.35 (tBuOCH$_2$, 2H, t, 3JH-H=7 Hz), 6.61 (CpH, 2H, t, 3JH-H=3 Hz), 5.76 (CpH, 2H, d, 3JH-H=3 Hz), 8.13 (FluH, 1H, m), 7.83 (FluH, 1H, m), 7.78 (FluH, 1H, m), 7.65 (FluH, 1H, m), 7.54 (FluH, 1H, m), 7.30 (FluH, 2H, m), 7.06 (FluH, 1H, m)

$^{13}$C NMR (400 MHz, CDCl$_3$): 27.5 (Me3CO, q, 1JC-H=124 Hz), −3.3 (MeSi, q, 1JC-H=121 Hz), $\overline{64.6}$, 66.7, 72.4, 103.3, 127.6, 128.$\overline{4}$, $\overline{129.0}$ (7C, s), 61.4 (Me$_3$COCH$_2$, t, 1JC-H=135 Hz), 14.5 (ipsoSiCH$_2$, t, 1JC-H=122 Hz), $\overline{33.1}$, 30.4, 25.9, 22.7 (4C, t, 1JC-H=119 Hz), 110.7, 111.4, 125.0, 125.1, 128.8, 128.1, 126.5, 125.9, 125.3, 125.1, 125.0, 123.8 (Flu$\underline{C}$ and Cp$\underline{C}$, 12C, d, 1JC-H=171 Hz, 3JC-H=10 Hz)

2-(2) Preparation of Supported Metallocene Catalyst

A supported metallocene catalyst was prepared in the same manner as in Example 1-(2), except that the metallocene compound obtained in Example 2-(1) (Compound B) was used instead of the metallocene compound obtained in Example 1-(1) (Compound A).

Example 3

3-(1) Preparation of [(CH$_3$)$_2$Si($^t$Bu-O—(CH$_2$)$_6$—(C$_5$H$_4$)(9-C$_{13}$H$_9$))ZrCl$_2$(Compound C)

A solution of t-butoxyhexylcyclopentadienyl lithium (0.016 mol; obtained by reacting t-butoxyhexylcyclopentadienide with n-butyl lithium in the presence of THF) was added to a solution of Me$_2$SiCl(9-C$_{13}$H$_{10}$) (obtained by reacting fluorenyl lithium with dichlorodimethylsilane in the presence of hexane) in THF (50 ml) at room temperature, and the reaction temperature was slowly raised to room temperature. The mixture was reacted at room temperature for 3 hours, and then all the volatile materials were removed by drying the mixture in a vacuum to obtain an oily liquid. Subsequently, hexane was added to the oily liquid and the mixture was filtered. The filtered hexane solution was dried in a vacuum to obtain a ligand ((CH$_3$)$_2$Si($^t$Bu-O—(CH$_2$)$_6$—(C$_6$H$_6$)(9-C$_{13}$H$_{10}$)) as a pale yellow oil (yield 99%). The structure of the ligand was confirmed by $^1$H NMR.

$^1$H NMR (400 MHz, C$_6$D$_6$): 1.09 (t-BuO, 9H, s), −0.13, −0.32, −0.61 (Me$_2$Si, 6H, s), 1.25 (CH$_2$, 2H, m), 1.24 (CH$_2$, 2H, m), 1.41 (CH$_2$, m), 2.25 (Cp-CH$_2$, 2H, m), 3.23 (tBuOCH$_2$, 2H, d of t, 3JH-H=7 Hz), 6.35, 6.05, 5.70 (CpH, 5H, m, m, brs), 3.05 (methyleneCpH, 2H, brs), 4.20, 4.00, 3.85 (FluH, 1H, s), 7.80 (FluH, 2H, m), 7.45 (FluH, 2H, m), 7.29-7.20 (FluH, 4H, m).

Subsequently, a dilithium salt was prepared in the same manner as in Example 2-(1) and reacted with ZrCl$_4$ to obtain a racemic-(CH$_3$)$_2$Si($^t$Bu-O—(CH$_2$)$_6$—(C$_5$H$_4$)(9-C$_{13}$H$_9$)ZrCl$_2$ compound as an orange solid (yield 25%).

$^1$H NMR (400 MHz, CDCl$_3$): 1.16 (t-BuO, 9H, s), 1.11 (Me$_2$Si, 3H, s), 1.13 (Me$_2$Si, 3H, s), 1.43 (CH$_2$, 4H, m), 1.25 (CH$_2$, 4H, m), 2.45 (Cp-CH$_2$, 2H, m), 3.26 (tBuOCH$_2$, 2H, t, 3JH-H=7 Hz), 5.41 (CpH, 1H, t, 3JH-H=3 Hz), 5.70 (CpH, 1H, t, 3JH-H=3 Hz), 6.28 (CpH, 1H, t, 3JH-H=3 Hz), 8.13 (FluH, 2H, m), 7.67-7.49 (FluH, 4H, m), 7.29 (FluH, 2H, m).

$^{13}$C NMR (400 MHz, CDCl$_3$): 27.5 (Me$_3$CO, q, 1JC-H=125 Hz), −3.3 (Me$_2$Si, q, 1JC-H=121 Hz), $\overline{27.6}$, 66.3, 72.4, 102.6, 113.8, 128.$\overline{8}$, $\overline{129}$.1, 141.9 (9C, s), 61.5 (Me$_3$COCH$_2$, t, 1JC-H=141 Hz), 30.5, 30.2, 30.0, 29.2, 25.9 (5C, t, $\overline{1JC}$-H=124 Hz), 111.6, 112.0, 119.7, 123.8, 123.9, 125.0, 126.3, 126.5, 128.0, 128.1, 128.7 (Flu$\underline{C}$ and Cp$\underline{C}$, 11C d, 1JC-H=161 Hz, 3JC-H=10 Hz).

3-(2) Preparation of Supported Metallocene Catalyst

A supported metallocene catalyst was prepared in the same manner as in Example 1-(2), except that the metallocene compound obtained in Example 3-(1) (Compound C) was used instead of the metallocene compound obtained in Example 1-(1) (Compound A).

Example 4

4-(1) Preparation of [($^t$Bu-O—(CH$_2$)$_6$)(CH$_3$)C(C$_5$H$_4$)(9-C$_{13}$H$_9$)]ZrCl$_2$ (Compound D)

Pyrrolidine (2.5 ml, 0.15 mol) was added to a mixture of 8-butoxy-2-octanone (13.5 g, 0.067 mol) and cyclopentadiene monomer (9.0 g, 0.14 mol) in the presence of anhydrous methanol solvent (200 ml) at room temperature and reacted for 12 hours. A solution of acetic acid (12 g, 0.2 mol) in water (200 ml) was added to the reaction solution and the mixture was stirred for 1 hour. Then, an organic layer was extracted with ether (300 ml) and the resultant liquid was distilled under reduced pressure (100° C., 500 mtorr) to obtain 6-methyl-6-t-butoxyhexylfulvene as a pale yellow oil (yield 40%).

A solution of fluorenyl lithium (4.48 g, 0.026 mol) in THF (100 ml) was slowly added to a solution obtained by dissolving the obtained 6-methyl-6-t-butoxyhexylfulvene (6.5 g, 0.026 mol) in THF (50 ml) at −78° C., and then, the mixture was stirred for 12 hours. Subsequently, a saturated $NH_4Cl$/water solution and ether were added to the obtained solution to extract the organic layer, and then, a ligand ($^tBu$-O—$(CH_2)_6$)($CH_3$)C($C_5H_5$)(9-$C_{13}H_{10}$) was obtained by chromatography (yield 97%).

$^1H$ NMR (400 MHz, $CDCl_3$): 1.19 (t-BuO, 9H, s), 0.58, 0.89 (MeC, 3H, s), 1.90 ($CH_2$, 2H, m), 1.49 ($CH_2$, 2H, m), 1.30 ($CH_2$, 4H, m), 1.27 ($CH_2$, 2H, m), 3.31 (tBuO$CH_2$, 2H, t, 3JH-H=7 Hz), 6.88, 6.62, 5.87 (CpH, 3H, brs), 3.07 (methylenenCpH, 2H, brs), 4.15 (FluH, 1H, s), 7.72 (FluH, 1H, m), 7.67 (FluH, 1H, m), 7.55 (FluH, 1H, m), 7.36 (FluH, 1H, m), 7.28 (FluH, 1H, m), 7.24 (FluH, 1H, m), 7.04 (FluH, 1H, m), 6.76 (FluH, 1H, m).

Next, 2 equivalents of n-butyl lithium (1.6 M in hexane) were added to a solution of the obtained ($^tBu$-O—$(CH_2)_6$)($CH_3$)C($C_5H_5$)(9-$C_{13}H_{10}$) (3.2 g, 0.008 mol) in THF (50 ml) at −78° C. and the mixture was stirred for 5 hours at room temperature. Thus, ($^tBu$-O—$(CH_2)_6$)($CH_3$)C($C_5H_4Li$)(9-$C_{13}H_9Li$) was obtained as a red solid (yield 88%).

Then, a solution of the obtained dilithium salt (2.5 g, 4.4 mmol) in hexane (50 ml) was slowly added to a suspension solution of zirconium(IV) chloride (1.02 g, 4.5 mmol) in hexane (50 ml) at −78° C. and the mixture was stirred at room temperature for 12 hours. All the volatile materials were removed by drying in a vacuum and the resultant product was extracted with toluene (100 ml) and washed with hexane several times to obtain a racemic-($^tBu$-O—$(CH_2)_6$)($CH_3$)C($C_5H_4$)(9-$C_{13}H_9$)$ZrCl_2$ compound (yield 31%).

$^1H$ NMR (400 MHz, $CDCl_3$): 1.18 (t-BuO, 9H, s), 2.39 (MeC, 3H, s), 1.82 ($CH_2$, 2H, m), 1.59 ($CH_2$, 4H, m), 1.46 ($CH_2$, 2H, m), 1.22 ($CH_2$, 2H, m), 3.34 (tBuO$CH_2$, 2H, t, 3JH-H=7 Hz), 6.33 (CpH, 2H, t, 3JH-H=2 Hz), 5.80-5.75 (CpH, 2H, m), 7.27 (FluH, 2H, m), 7.56 (FluH, 2H, m), 7.63 (FluH, 1H, d, 3JH-H=9 Hz), 7.82 (FluH, 1H, d, 3JH-H=9 Hz), 8.14 (FluH, 2H, m).

$^{13}C$ NMR (400 MHz, $CDCl_3$): 27.5 ($\underline{Me_3}CO$, q, 1JC-H=124 Hz), −3.3 (MeSi, q, 1JC-H=121 Hz), $\overline{64.6}$, 66.7, 72.4, 103.3, 127.6, 128.$\overline{4}$, $\overline{1}$29.0 (7C, s), 61.4 ($Me_3CO\underline{C}H_2$, t, 1JC-H=135 Hz), 14.5 (ipsoSi$\underline{C}H2$, t, 1JC-H=122 Hz), $\overline{3}$3.1, 30.4, 25.9, 22.7 (4C, t, 1JC-H=119 Hz), 110.7, 111.4, 125.0, 125.1, 128.8, 128.1, 126.5, 125.9, 125.3, 125.1, 125.0, 123.8 (Flu$\underline{C}$ and Cp$\underline{C}$, 12C, d, 1JC-H=171 Hz, 3JH-H=10 Hz).

4-(2) Preparation of Supported Metallocene Catalyst

A supported metallocene catalyst was prepared in the same manner as in Example 1-(2), except that the metallocene compound obtained in Example 4-(1) (Compound D) was used instead of the metallocene compound obtained in Example 1-(1) (Compound A).

Example 5

5-(1) Preparation of [($CH_3$)$_2$C($^tBu$-O—$(CH_2)_6$—($C_5H_4$)(9-$C_{13}H_9$))]$ZrCl_2$ (Compound E)

6,6-dimethyl-3-(6-t-butoxyhexyl)fulvene was obtained using t-butoxyhexylcyclopentadiene and anhydrous acetone in the same manner as in Example 4-(1) (yield 59%). Then, fluorenyl lithium was added to the 6,6-dimethyl-3-(6-t-butoxyhexyl)fulvene to obtain a ligand ($CH_3$)$_2$C($^tBu$-O—$(CH_2)_6$—($C_5H_5$)(9-$C_{13}H_{10}$) as a yellow oil (yield 70%).

$^1H$ NMR (400 MHz, $CDCl_3$): 1.19, 1.20 (t-BuO, 9H, s), 1.06, 1.05, 1.02 ($Me_2C$, 6H, s), 1.27 ($CH_2$, 2H, m), 1.41 ($CH_2$, 2H, m), 1.58 ($CH_2$, 4H, m), 2.50, 2.46, 2.36 (Cp-$CH_2$, 2H, t, 3JH-H=7 Hz), 3.36 (tBuO$CH_2$, 2H, d of t, 3JH-H=7 Hz), 6.53, 6.10, 6.00, 5.97, 5.69 (CpH, 5H, brs), 3.07 (methyleneCpH, 2H, brs), 4.14, 4.11, 4.10 (FluH, 1H, s), 7.70 (FluH, 2H, m), 7.33 (FluH, 2H, m), 7.23-7.10 (FluH, 4H, m).

Dilithium salt was then reacted with zirconium(IV) chloride in the same manner as in Example 4-(1) to obtain a racemic-($CH_3$)$_2$C($^tBu$-O—$(CH_2)_6$—($C_5H_4$)(9-$C_{13}H_9$)$ZrCl_2$ compound as an orange solid (yield 63%).

$^1H$ NMR (400 MHz, $CDCl_3$): 1.16 (t-BuO, 9H, s), 2.35 ($Me_2C$, 3H, s), 2.40 ($Me_2C$, 3H, s) 1.46 ($CH_2$, 4H, m), 1.27 ($CH_2$, 4H, m), 1.20 ($CH_2$, 2H, m), 2.52 (Cp-$CH_2$, 2H, m), 3.27 (tBuO$CH_2$, 2H, t, 3JH-H=7 Hz), 5.43 (CpH, 1H, t, 3JH-H=3 Hz), 5.67 (CpH, 1H, t, 3JH-H=3 Hz), 6.01 (CpH, 1H, t, 3JH-H=3 Hz), 8.15 (FluH, 2H, m), 7.80 (FluH, 2H, m), 7.54 (FluH, 2H, m), 7.26 (FluH, 2H, m)

$^{13}C$ NMR (400 MHz, $CDCl_3$): 27.5 ($\underline{Me_3}CO$, q, 1JC-H=124 Hz), 15.3 ($\underline{Me_2}C$, q, 1JC-H=124 Hz), $\overline{40.4}$ ($Me_3\underline{C}$, s), 25.9 ($Me_2\underline{C}$, s), 68.$\overline{1}$, 72.4, 78.8, 113.8, 122.6, 136.4, $\overline{1}$42.0 (7C, s), 61.$\overline{5}$ ($Me_3CO\underline{C}H_2$, t, 1JC-H=140 Hz), 65.8 (Cp$\underline{C}H_2$, t, 1JC-H=138 Hz), 30.$\overline{5}$, 29.7, 29.2, 27.6 (4C, t, 1JC-H$\overline{=}$124 Hz), 103.0, 103.1, 117.2, 128.9, 128.2, 125.3, 124.9, 124.8, 123.4, 123.2, 123.1 (Flu$\underline{C}$ and Cp$\underline{C}$, 11C d, 1JC-H=171 Hz, 3JC-H=10 Hz)

5-(2) Preparation of Supported Metallocene Catalyst

A supported metallocene catalyst was prepared in the same manner as in Example 1-(2) (Compound E), except that the metallocene compound obtained in Example 5-(1) was used instead of the metallocene compound obtained in Example 1-(1) (Compound A).

Example 6

6-(1) Preparation of $^tBu$-O—$(CH_2)_6$)($CH_3$)Si($C_5$($CH_3$)$_4$)($NCMe_3$)$TiCl_2$ (Compound F)

Grignard reagent, a t-butoxyhexylmagnesium chloride solution (0.14 mol) was obtained by reacting t-butoxyhexylchloride with Mg(O) in the presence of diethyl ether ($Et_2O$) as a solvent. Trichloromethylsilane (24.7 ml, 0.21 mol) was added to the Grignard reagent at −100° C. and the mixture was stirred at room temperature for at least 3 hours and then filtered. The filtrate was dried in a vacuum to obtain t-butoxyhexyldichloromethylsilane (yield 84%).

Meanwhile, n-butyl lithium (26 ml, 0.042 mol) was slowly added to a solution of 1,2,3,4-tetramethylcyclopentadiene (5 g, 0.041 mol) in 100 ml of THF at −78° C. and the mixture was stirred for 2 hours. Then, the solvent was removed and the resultant product was washed with hexane and dried to obtain tetramethylcyclopentadienyl lithium (yield 76%).

A solution of the obtained tetramethylcyclopentadienyl lithium (4.0 g, 0.031 mol) in 100 ml of THF was slowly added to a solution of t-butoxyhexyldichloromethylsilane (0.12 mol) in 100 ml of THF at −78° C. and the mixture was stirred for 1 hour. Then, the reaction solvent was removed in reduced pressure and the remaining t-butoxyhexyldichloromethylsilane was removed. Then, extraction was carried out with 150 ml of hexane and the solvent was removed. Thus, $^tBu$-O—$(CH_2)_6$SiClMe$C_5$($CH_3$)$_4$ was obtained as a yellow liquid.

A solution of t-BuNHLi (2.5 g, 0.031 mol) in 50 ml of THF was slowly added to a solution of the obtained 'Bu-O—(CH$_2$)$_6$SiClMe(C$_5$(CH$_3$)$_4$) (6.67 g, 0.031 mol) in 50 ml of THF at −78° C. and the mixture was stirred for 1 hour at room temperature. Then, the solvent was removed and the resultant product was extracted with 150 ml of hexane to obtain 'Bu-O—(CH$_2$)$_6$Si(NHt-Bu)Me(C$_5$(CH$_3$)$_4$) as a yellow compound.

A solution of n-butyl lithium (39 ml, 0.062 mol) in hexane was slowly added to a solution of the obtained 'Bu-O—(CH$_2$)$_6$Si(NHt-Bu)Me(C$_5$(CH$_3$)$_4$) (0.31 mol) in 100 ml of hexane at −78° C. and the mixture was stirred at room temperature for 24 hours. Then, the solvent was removed and the resultant product was dissolved in 100 ml of toluene. The obtained solution was slowly added to a solution of Titanium (III) chloride tetrahydrofuran complex (14.1 g, 0.038 mol) in 100 ml of toluene at −78° C. and the mixture was stirred at room temperature for 12 hours. Subsequently, PbCl$_2$ (9.0 g, 0.032 mol) was added to the mixture and after stirring for 1.5 hours, the solvent was removed. The desired product was extracted with 100 ml of hexane and the hexane was removed by drying in a vacuum. Thus, 'Bu-O—(CH$_2$)$_6$)(CH$_3$)Si(C$_5$(CH$_3$)$_4$)(NCMe$_3$)TiCl$_2$ was obtained as a dark green, sticky substance (yield 54%).

$^1$H NMR (400 MHz, CDCl$_3$): 0.67 (Si—CH$_3$, 3H, s), 1.16 (t-BuO, 9H, s), 1.45 (N C(CH$_3$)$_3$, 9H, s), 1.14-1.55 (CH$_2$, 8H, m), 2.05-2.18 (CH$_2$, 2H, m), 2.13 (C(CH$_3$)$_2$, 6H, s), 2.24 (C(CH$_3$)$_2$, 6H, s), 3.35 (OCH$_2$, 2H, t)

6-(2) Preparation of Supported Metallocene Catalyst

A supported metallocene catalyst was prepared in the same manner as in Example 1-(2), except that the metallocene compound obtained in Example 6-(1) (Compound F) was used instead of the metallocene compound obtained in Example 1-(1) (Compound A).

Example 7

Preparation of the Supported Catalysts of Hybridged Metallocene

Mixture of Metallocene Catalysts 1.6 g of a carrier on which a cocatalyst is supported was placed into a glass reactor, 10 ml of toluene was added thereto and the mixture was stirred. A solution in which 16.5 µmol (in terms of zirconium) of the metallocene compound obtained in Example 1-(1) (Compound A) was dissolved in toluene was added to the glass reactor and the mixture was reacted at 40° C. for 1 hour while stirring, and then, the filtrate was removed. Subsequently, a solution in which 148.5 µmol (in terms of zirconium) of the metallocene compound obtained in Example 2-(1) (Compound B) was dissolved in toluene was added to the glass reactor and the mixture was reacted at 40° C. for 1 hour while stirring. Then, the resultant product was washed with a sufficient amount of toluene and dried to obtain solid powders.

Example 8

Preparation of the Supported Catalysts of Hybridized Metallocene

Mixture of Metallocene Catalysts

A supported metallocene catalyst was prepared in the same manner as in Example 7, except that the metallocene compound (Compound F) obtained in Example 6-(1) was used for the reaction after instead of the metallocene compound (Compound A) obtained in Example 1-(1) had been supported. ICP analysis of the supported catalyst revealed that [Al]=15.1%, [Zr]=870 ppm, and [Ti]=4000 ppm, which indicates that 99% of the compound obtained in Example 1-(1) and at least 96% of the compound obtained in Example 6-(1) were supported on the carrier.

Examples 9 through 16

Polymerization of Ethylene

Each of the supported catalysts obtained in Examples 1 through 8 was quantified, placed into a 50 ml glass bottle, sealed using a rubber film in a dry box, and then removed from the dry box. Polymerization was performed in a 2 l high pressure reactor equipped with a mechanical stirrer and temperature-controlled. 1 l of hexane containing 1.0 mmol of triethylaluminum and each of the supported catalysts were charged into the 2 l high pressure reactor without contacting air and polymerization was performed at 80° C. for 1 hour while continuously feeding gaseous ethylene monomer at a pressure of 9 kgf/cm$^2$ into the reactor. The polymerization reaction was stopped by evacuating the unreacted ethylene after stopping the stirring. The obtained product was filtered to remove most of the polymerization solvent and dried in a vacuum oven at 80° C. for 4 hours. The ethylene polymerization activity, the molecular weight and molecular weight distribution, the melt index, and the melting point of the polymer obtained using each of the supported catalysts are shown in Table 2.

When the supported catalysts obtained in Examples 1 through 8 were used in the polymerization of ethylene, fouling, i.e., the accumulation of the polymer on walls of the reactor or aggregation between the polymer particles, was not observed and the resultant polymers had a high apparent density of 0.34-0.45 g/cc.

Comparative Examples 1 Through 6

Polymerization of Ethylene

Solution polymerization was performed with an ethylene pressure of 40 psi using the metallocene compounds A through F obtained in respective (1) of Examples 1 through 6 and MAO as a cocatalyst in the presence of toluene as a solvent. At this time, a carrier was not used. That is, 0.5 µmol (in terms of zirconium) of each of the metallocene compounds A through F was dissolved in toluene and then 1.9 ml of MAO (4.0% Al toluene solution) were placed into a 500 ml glass reactor equipped with a mechanical stirrer and a pressure controller. In this case, the molar ratio of [Al]/[M] was 5000. 250 ml of toluene was used as the solvent for polymerization. The reactor was dipped in a water bath at 60° C. and stirred for 5 minutes, and the polymerization was performed for 10 minutes with an ethylene pressure of 40 psi, while stirring. After stopping the ethylene injection and the stirring, the unreacted ethylene was evaporated and methanol was added to stop the polymerization. After a 1N HCl solution was added to the obtained product, the mixture was stirred, filtered and dried in a vacuum, and the resultant polyethylene was analyzed using gel permeation chromatography (GPC). The ethylene polymerization activity, the weight average molecular weight, the molecular weight distribution (PDI), and the melting point of the polyethylene are shown in Table 1.

Comparative Examples 7 Through 9

Polymerization of Ethylene

Polymerization of ethylene was performed in the same manner as in Comparative Example 1, except that ($C_6H_{13}$—$C_5H_4)_2ZrCl_2$, $(CH_3)_2C(C_5H_4)(C_{13}H_9)ZrCl_2$, and $(CH_3)_2Si[C_5(CH_3)_4]NC(CH_3)_3]TiCl_2$ were respectively used as a catalyst. The ethylene polymerization activity, the weight average molecular weight, the molecular weight distribution (PDI), and the melting point of the polyethylene are shown in Table 1.

TABLE 1

| | Activity (kg PE/mmole M · hr) | Mw (×10³) | PDI | Tm (° C.) |
|---|---|---|---|---|
| Comparative Example 1 | 175.2 | 531 | 1.8 | 135.8 |
| Comparative Example 2 | 74.2 | 1,208 | 3.0 | 136.5 |
| Comparative Example 3 | 10.1 | 998 | 2.7 | 135.2 |
| Comparative Example 4 | 15.6 | 606 | 2.8 | 133.9 |
| Comparative Example 5 | 10.1 | 478 | 2.5 | 134.0 |
| Comparative Example 6 | 15.6 | 1,421 | 1.8 | 134.4 |
| Comparative Example 7 | 88.2 | 657 | 1.8 | 137.5 |
| Comparative Example 8 | 8.88 | 496 | 2.5 | 134.8 |
| Comparative Example 9 | 15.6 | 1,450 | 1.7 | 136.0 |

Comparative Examples 10 Through 12

Supported metallocene catalysts were prepared in the same manner as in Example 1-(2), except that $(C_6H_{13}$—$C_5H_4)_2ZrCl_2$, $(CH_3)_2C(C_5H_4)(C_{13}H_9)ZrCl_2$, $(CH_3)_2Si[C_5(CH_3)_4]N(C(CH_3)_3)]TiCl_2$ used in Comparative Examples 7 through 9 were respectively used instead of the metallocene compound A according to an embodiment of the present invention. The polyolefin polymerization was performed in the same manner as in Example 9. The results are shown in Table 2.

TABLE 2

| | Activity (g PE/g cata · hr) | $I_2$ (g/10 min) | $I_{21}/I_5$ | Mw (×10³) | PDI | Tm (° C.) |
|---|---|---|---|---|---|---|
| Example 9 | 8,330 | 0.756 | 6.4 | 312 | 2.3 | 133.1 |
| Example 10 | 3,500 | 0.0071 | 8.6 | 611 | 5.1 | 135.0 |
| Example 11 | 1,710 | 0.0175 | 8.0 | 542 | 3.2 | 134.1 |
| Example 12 | 2,500 | 0.0747 | 7.6 | 466 | 2.4 | 132.1 |
| Example 13 | 2,010 | 0.137 | 7.0 | 327 | 2.5 | 132.9 |
| Example 14 | 2,100 | 0 | — | 860 | 2.2 | 134.8 |
| Example 15 | 4,520 | 0.117 | 8.0 | 417 | 6.0 | 134.5 |
| Example 16 | 4,040 | 0 | 12.8 | 620 | 7.2 | 134.3 |
| Comparative Example 10 | 740 | 0.147 | 7.0 | 340 | 2.5 | 134.2 |
| Comparative Example 11 | 80 | — | — | — | — | 132.6 |
| Comparative Example 12 | 65 | — | — | — | — | 133.8 |

Comparative Example 10: $SiO_2/MAO/(C_6H_{13}$—$C_5H_4)_2ZrCl_2$,
Comparative Example 11: $SiO_2/MAO/(CH_3)_2C(C_5H_4)(C_{13}H_9)ZrCl_2$,
Comparative Example 12: $SiO_2/MAO/(CH_3)_2Si[C_5(CH_3)_4]NC(CH_3)_3]TiCl_2$.

Referring to Table 1, the solution polymerization of polyethylene was performed without using a carrier in Comparative Example 1, (in which Compound A which contains a functional group that functions as a Lewis base, was used), and Comparative Example 7, (in which the metallocene compound $(C_6H_{13}$—$C_5H_4)_2ZrCl_2$, which does not contain the functional group that functions as a Lewis base, was used), and the activity of Compound A was about twice the activity of the metallocene compound $(C_6H_{13}$—$C_5H_4)_2ZrCl_2$. Referring to Table 2, Compound A, which was used in Comparative Example 1, supported on the carrier was used in Example 9, and the metallocene compound $(C_6H_{13}$—$C_5H_4)_2ZrCl_2$, which was used in Comparative Example 7, supported on the carrier was used in Comparative Example 10. The activity of the supported catalyst, $(SiO_2/MAO/[^tBu-O$—$(CH_2)_6$—$C_5H_4]_2ZrCl_2)$ (8,330 g PE/g cata), in Example 9 was at least ten times greater than the activity of the supported catalyst, $(SiO_2/MAO/(C_6H_{13}$—$C_5H_4)_2ZrCl_2)$ (740 g PE/g cata), in Comparative Example 10. That is, the supported metallocene catalyst according to an embodiment of the present invention had a high activity due not only to the high activity of the metallocene compound used in the supported metallocene catalyst, but also to the Lewis acid-base interaction between the metallocene compound and the cocatalyst, where the contribution of the latter was larger than the contribution of the former.

The polymers prepared using the supported catalysts obtained in Comparative Examples 10 through 12 induced severe fouling and had bad particle shapes and an apparent density of 0.1 g/ml or less.

ICP analysis of the supported catalyst prepared in Comparative Example 10 revealed that [Zr]=0.40%, [Al]=10.8%, and a molar ratio of [Al]/[Zr]=91. This indicates that only 45% of Zr added in the preparation of the supported metallocene catalyst was supported on the carrier. The amount of the catalyst supported on the carrier in Comparative Example 10 was remarkably less than the amount of the catalyst supported on the carrier analyzed by ICP in Example 1. Further, the amount of Al in Comparative Example 10 was less than the amount of Al in Example 1 even though the cocatalyst-supported carrier used in Comparative Example 10 was the same as the cocatalyst-supported carrier used in Example 1. This means that the metallocene catalyst that did not contain the functional group that functions as a Lewis base was separated from a surface of the carrier. The separation of the catalyst from the carrier increased as the temperature increased, and thus, the fouling severely occurred during the polymerization.

Since the Lewis acid-base interaction occurs between the metallocene catalyst and the cocatalyst in the supported metallocene catalyst according to an embodiment of the present invention as described above, the active catalyst is securely fixed to the carrier without being separated from the carrier in slurry polymerization using a solvent such as hexane, etc. and fouling does not occur. Thus, the polymer prepared using the supported metallocene catalyst has a good particle shape and a high apparent density.

The activity of the supported mixture of metallocene catalysts obtained in Example 8 in which Compounds A and F were used in the polyethylene polymerization (Example 16) was twice the activity of the supported metallocene catalyst obtained in Example 6 in which Compound F was used in the polyethylene polymerization (Example 14). The polymer obtained in Example 16 had a lower molecular weight and a broader distribution of molecular weight than the polymer obtained in Example 14. By controlling compositional ratios of the respective metallocene compounds in the supported mixture of metallocene catalysts, the activity of the catalyst can also be controlled and the physical properties and molecular weight distributions of the polymers can be controlled over a wide range. That is, a supported metallocene catalyst which can control the molecular weight distribution in a single reactor can be prepared.

INDUSTRIAL APPLICABILITY

As described above, in a supported metallocene catalyst according to the present invention, a Lewis acid-base interaction occurs between the metallocene catalyst and a cocatalyst, and thus a larger amount of metallocene can be supported on a carrier. Also, little catalyst is separated from the carrier during the polymerization of polyolefin in a slurry or gas phase method, thereby preventing fouling, i.e., the accumulation of the polymer on walls of the reactor or aggregation between the polymer particles, and the polymer prepared has a good particle shape and a high apparent density. Thus, the supported metallocene catalyst can be suitably used in a conventional slurry or gas phase polymerization process. Further, the physical properties and molecular weight distribution of the polyolefin (prepared using at least one metallocene catalysts supported on a carrier) can be controlled over a wide range and may be molded in various products, for example, rotary molded products, injection molded products, films, containers, pipes, and fibers. In particular, due to the high polymerization activity of the supported metallocene catalyst according to the present invention, the molecular weight distribution can be controlled in a single reactor with low production costs.

The invention claimed is:

1. A supported metallocene catalyst-cocatalyst structure consisting of:
a group 13 metal-containing organometallic compound as a cocatalyst component
a carrier; and
a metallocene compound;
wherein the cocatalyst is bound to the carrier through a bond between a hydroxyl oxygen on the carrier surface and the group 13 metal atom; and
the metallocene compound is connected to said cocatalyst bound to the carrier, the metallocene compound being connected to said cocatalyst through an acid-base interaction between a Lewis base group of the metallocene compound and a Lewis acid of the group 13 metal atom, as well as an ionic bond between the metallocene compound and the cocatalyst,
said metallocene compound being selected from the group consisting of subgroups 1-3;
wherein subgroup 1 consists of compounds of general formulas $[A-O-(CH_2)_a-C_5H_4]_2ZrCl_2$ and $[A-O-(CH_2)_a-C_9H_6]ZrCl_3$;
subgroup 2 consists of compounds of general formulas $[A-O-(CH_2)_a-C_5H_4]C(CH_3)_2[C_{13}H_8]ZrCl_2$, $[A-O-(CH_2)_a-C_5H_4]Si(CH_3)_2[C_{13}H_8]ZrCl_2$, $[C_5H_5]C(CH_3)(A-O-(CH_2)_a)[C_{13}H_8]ZrCl_2$ and $[C_5H_5]Si(CH_3)(A-O-(CH_2)_a)[C_{13}H_8]ZrCl_2$; and
subgroup 3 consists of compounds of a general formula $[(A'-D-(CH_2)_a)](CH_3)X(C_5Me_4)(NCMe_3)]TiCl_2$,
said a being an integer ranging from 4 to 8,
said A being a radical selected from the group consisting of methoxymethyl, t-butoxymethyl, tetrahydropyranyl, tetrahydrofuranyl, 1-ethoxyethyl, 1-methyl-1-methoxyethyl, and t-butyl,
said X being methylene, ethylene, or silicon,
said D being an oxygen or a nitrogen atom, and
said A' being a radical selected from the group consisting of a hydrogen atom, $C_1$-$C_{20}$ alkyl, alkenyl, aryl, alkylaryl, arylalkyl, alkylsilyl, arylsilyl, methoxymethyl, t-butoxymethyl, tetrahydropyranyl, tetrahydrofuranyl, 1-ethoxyethyl, 1-methyl-1-methoxyethyl, and t-butyl; and
wherein the Lewis base group is one or more atoms selected from the oxygen and nitrogen atoms within the metallocene compound, and
wherein said carrier is silica, silica-alumina, or silica-magnesia dried at 200 to 400° C.

2. The supported metallocene catalyst-cocatalyst structure of claim 1, wherein the cocatalyst is a compound having Formula 7:

$$—[Al(R^3)—O]_n— \qquad (7)$$

wherein
$R^3$ is a halogen radical, a $C_1$-$C_{20}$ hydrocarbyl radical, or a $C_1$-$C_{20}$ hydrocarbyl radical substituted by halogen; and the $R^3$ radicals are identical or different from each other; and
n is an integer equal to or greater than 2.

3. The supported metallocene catalyst-cocatalyst structure of claim 2, wherein the compound having Formula 7 is methylaluminoxane (MAO), ethylaluminoxane, isobutylaluminoxane, or butylaluminoxane.

4. The supported metallocene catalyst-cocatalyst structure of claim 1, wherein the supported amount of the cocatalyst is 1-10,000 mol of a group 13 metal contained in the cocatalyst per mol of the transition metal contained in the metallocene compound.

5. A method of preparing a supported metallocene catalyst-cocatalyst structure, comprising:
reacting a cocatalyst comprising a group 13 metal-containing compound with a hydroxyl group on the surface of a silica, silica-alumina, or silica-magnesia carrier, thereby obtaining a cocatalyst-supported carrier, said carrier having been dried at 200 to 400° C. before reacting with the cocatalyst; and
supporting a metallocene compound according to claim 1 on the cocatalyst-supported carrier maintaining a strong bond due to a Lewis acid-base interaction between a Lewis base of the metallocene compound and the metal atom of the cocatalyst.

6. The method of claim 5, wherein in the supporting of the metallocene compound, at least two different metallocene compounds are supported sequentially or simultaneously on the carrier.

7. The method of claim 5, wherein the cocatalyst is MAO, ethylaluminoxane, isobutylaluminoxane, or butylaluminoxane.

8. A method of preparing a polyolefin, comprising polymerizing an olefin monomer in the presence of the supported metallocene catalyst of claim 1.

9. The method of claim 8, wherein the supported metallocene catalyst is a catalyst prepolymerized through a contact reaction with the olefin monomer.

10. The method of claim 8, wherein the polymerization is performed using a slurry process or a gas phase process.

11. The method of claim 8, wherein the supported metallocene catalyst is injected into the olefin monomer in the form of a slurry, obtained by diluting the supported metallocene catalyst with a $C_5$-$C_{12}$ aliphatic hydrocarbon solvent, an aromatic hydrocarbon solvent, or a chlorine-substituted-hydrocarbon solvent.

12. The method of claim 8, wherein the olefin monomer includes at least one monomer selected from the group consisting of α-olefin, cyclic olefin, diene olefin monomer, and triene olefin monomer.

13. The supported metallocene catalyst-cocatalyst structure of claim 1, wherein the concentration of the hydroxy group on the surface of the carrier is 0.5-10 mmol/g.

* * * * *